March 5, 1957 O. RENNER 2,784,351
ELECTROSTATIC HIGH VOLTAGE GENERATORS
Filed Sept. 15, 1953 2 Sheets-Sheet 1
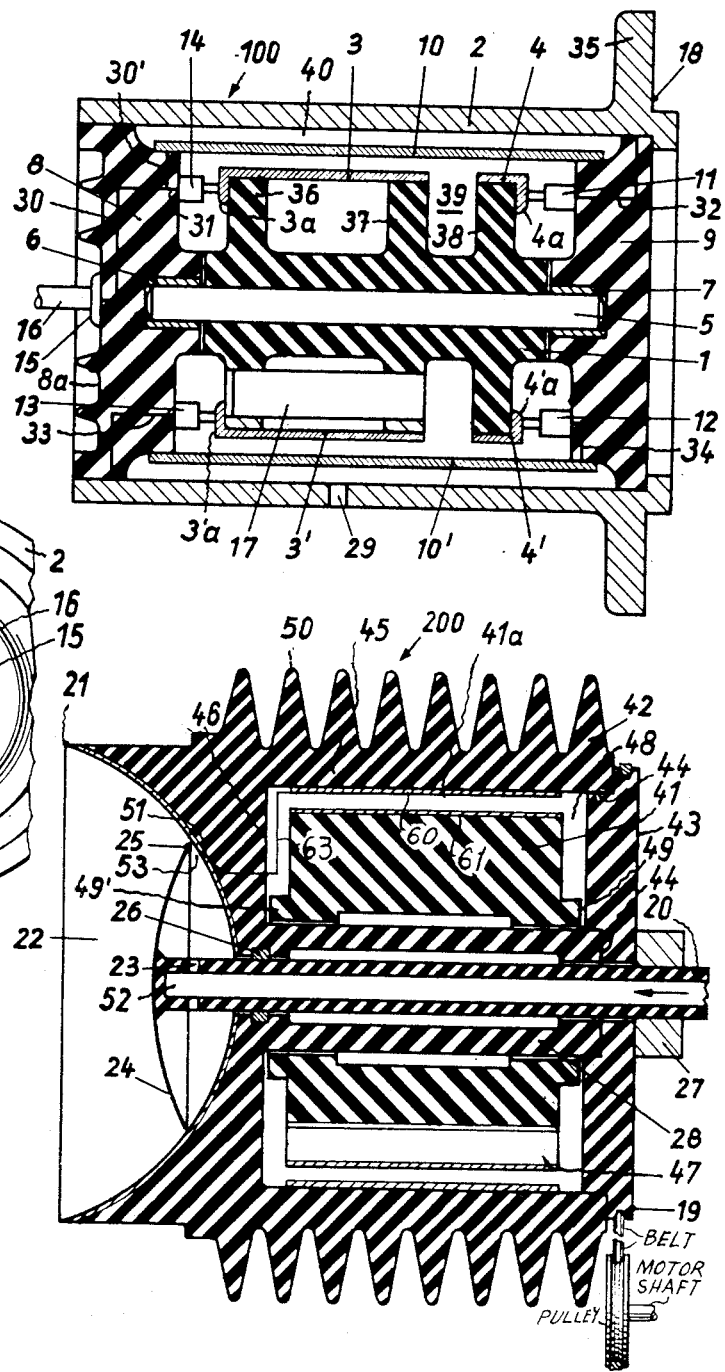
INVENTOR
Otto Renner
BY Hans L. Joseph
AGENT

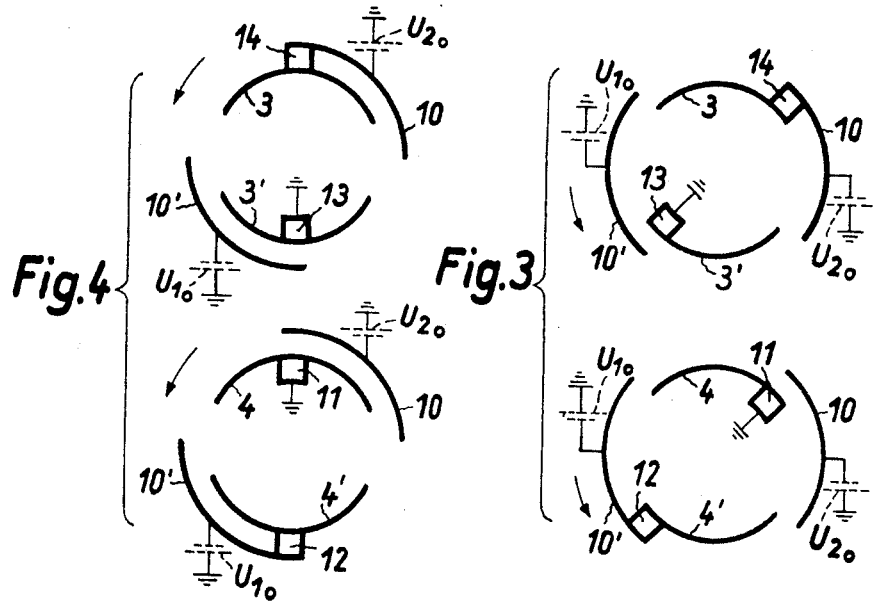
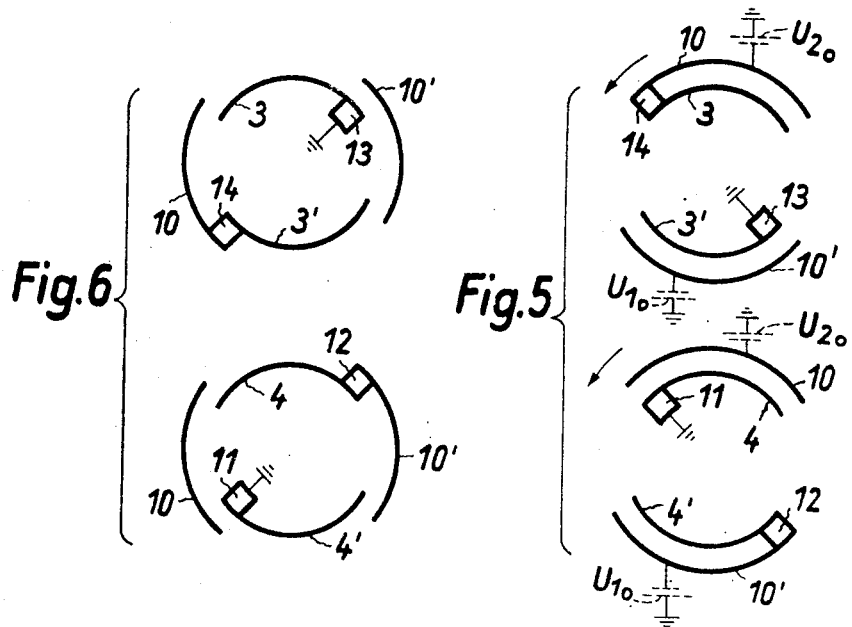

United States Patent Office 2,784,351
Patented Mar. 5, 1957

2,784,351

ELECTROSTATIC HIGH VOLTAGE GENERATORS

Otto Renner, Frankfurt am Main, Germany, assignor to Licentia Patent-Verwaltungs-G. m. b. H., Hamburg, Germany Application September 15, 1953, Serial No. 380,264

Claims priority, application Germany September 15, 1952

10 Claims. (Cl. 317—3)

The present invention relates to electrostatic machines, and more particularly to electrostatic high voltage generators.

Electrostatic generators are known having at least one stationary electrode and at least one movable electrode, which are arranged in a housing filled with a gaseous dielectric having an absolute pressure of 20 to 30 atmospheres, the housing carrying the stationary electrodes, whereas the movable electrodes are arranged inside the housing together with an electric motor driving the same so that the housing has a large volume.

It is an object of the present invention to reduce the volume of the housing of such electrostatic generators.

It is another object of the present invention to render easily accessible the parts of the generator, and particularly the movable parts thereof so that they can be repaired and/or exchanged without much difficulty in case of their being defective.

It is a further object of the present invention to enable the electric motor driving the generator to be used for other purposes as well.

An electrostatic high voltage generator according to the present invention comprises a first member forming a pressure-resistant hollow housing containing a gaseous dielectric, means for imparting to the housing a rotation about a stationary axis arranged inside the housing, at least one movable electrode rigidly connected to the first member and being arranged inside the housing in the gaseous dielectric, a second member arranged in a substantially fixed position inside the housing so as to be enclosed thereby, and at least one stationary electrode rigidly connected to the second member, the stationary electrode being arranged in the gaseous dielectric, whereby by a rotation of the housing about the stationary axis thereof the movable electrode rigidly connected thereto is moved with respect to the stationary electrode so that an electric potential difference is generated between the stationary electrode and the movable electrode rigidly connected to the housing.

Preferably means are provided for eccentrically weighting the second member so as to prevent any appreciable movement thereof in space.

In a preferred embodiment of the present invention the housing has two end walls arranged at opposite ends thereof, the imparting means being arranged at one of the two end walls, the other of the two end walls being exposed and preferably provided with means, such as a conducting brush, for taking off the high potential from the other one of the two end walls.

In one embodiment of the present invention forming an electrostatic corona discharging device, the other of the two end walls is recessed at the outside thereof so as to form an electro-conductive recessed part, and means are connected to the recessed part for introducing a spraying material, for instance a lacquer or a varnish, thereinto, the movable electrode being electrically connected with the electroconductive recessed part so that the electric potential of the movable electrode is transmitted through the recessed part to the spraying material introduced thereinto.

Preferably this embodiment is provided with a hollow pipe consisting of insulating material and arranged at least partly coaxially with, and inside, a hollow cylinder forming the inner wall portion of the first member so as to terminate inside the recessed part, the hollow pipe being adapted to introduce a spraying material into the recessed part having an outer edge for spraying the spraying material.

The hollow pipe can be provided with a closed end projecting into the recessed part and have at least one opening therein, a screen being arranged at the closed end of the hollow pipe and forming with the recessed part an annular slot so that the spraying material leaving the hollow pipe through the opening enters the space defined by the screen and the recessed part, and hence passes through the annular slot to the outer wall portion of the recessed part.

Preferably means are provided for adjusting the width of the annular slot, for instance a ring arranged on the outer wall of the hollow pipe and abutting against the outer face of one of the end walls of the first member.

In this embodiment the electric motor driving the first member or housing can serve for driving at the same time other parts such as periodically moved parts of the spraying device, devices for conveying the spraying material, fans, and the like, so that a design of the spraying plant is obtained which is particularly economical.

The high voltage potential can be taken off at the free end wall of the housing and fed to the recessed part thereof along the shortest possible path.

The present invention will now be described more in detail with reference to the accompanying drawings showing, by way of example, some embodiments of the present invention. In the drawings Fig. 1 is a longitudinal section of a first embodiment of the present invention;

Fig. 2 is an end view thereof;

Figs. 3–6 are diagrams for explaining the operation of the embodiment of the present invention shown in Fig. 1; and Fig. 7 is a longitudinal section of a second embodiment of the present invention.

Referring now to the drawings, and first to Figs. 1–6 showing a first embodiment of the present invention, a first member 100 forms a pressure-resistant housing and comprises a cylindrical wall portion 2 preferably consisting of electroconductive material and two parts 8 and 9 consisting of insulating material and forming end walls arranged at opposite ends of the cylindrical wall portion 2. The housing 100 contains a gaseous dielectric such as compressed air which enters the housing through an aperture 29 which is eventually closed. The housing 100 is provided with a flanged portion 35 having a plane face 18 for connecting thereto an electric motor (not shown) or the like imparting to the flanged portion 35 and thus to the housing 100 a rotation about the longitudinal axis thereof.

The end walls 8 and 9 are provided, respectively, at the central portions of the inner face thereof with bearings 6 and 7 which support a shaft 5 and allow the housing 100 to be easily rotated about the shaft 5. The shaft 5 supports a second member 1 preferably consisting of insulating material and arranged in a substantially fixed position inside the housing 100 so as to be enclosed thereby. The second member 1 is prevented from any appreciable movement thereof in space by an eccentrically arranged weight 17.

Two movable electrodes 10 and 10′ are rigidly connected to the first member 100 and are arranged inside the housing 100 in the gaseous dielectric filling the same.

Preferably the movable electrodes 10 and 10' are shaped (Fig. 3) as parts or segments of a hollow cylinder preferably extending each over one quarter of the circumference thereof, and connected, respectively, to electrical connections 30' and 34 which are embedded into the insulating end walls 8 and 9, respectively.

The second member 1 includes three disc-shaped portions 36, 37, 38 which are separated from one another and the inner faces of the end walls 8 and 9 by gaps such as 39 communicating with the cylindrical space 40 inside the housing 100 which is filled with the gaseous dielectric and separates the cylindrical wall portion 2 from the second member 1. As will be seen from the drawing the movable electrodes 10 and 10' are arranged in the space 40 as are the stationary electrodes 3, 4, 3', 4' more fully to be described hereinafter.

As clearly shown in Fig. 1 the electrical connection 30' is connected to electrical connections 30 and 31. Electrical connection 31 is connected with a brush 14 sliding in the position shown in Fig. 1 on an angular extension 3a of the stationary electrode 3. Electrical connection 30 is connected to a high potential electrode 15 rigidly secured to the center of the outer face 8a of the end wall 8. A conducting brush 16 is in sliding contact with the electrode 15 and consequently through connections 30 and 30' with the movable electrode 10.

The electrical connection 32 connects the cylindrical wall portion 2 consisting of electroconductive material and being preferably kept at ground potential, with a brush 11 sliding in the position shown in Fig. 1 on an angular extension 4a of the stationary electrode 4. The electrical connection 33 connects the cylindrical wall portion 2 with a brush 13 sliding in the position shown in Fig. 1 on an angular extension 3'a of the stationary electrode 3'. The electrical connection 34 connects the movable electrode 10' with a brush 12 sliding in the position shown in Fig. 1 on an angular extension 4'a of the stationary electrode 4'.

The electrodes 3, 4, 3', 4', 10 and 10' are shaped as clearly shown in Figs. 3–6, as cylindrical segments covering each about a quarter of a full cylinder. The segments 3 and 4 on the one hand, and 3' and 4' on the other hand, have equal radius and are arranged so as to form continuations of each other, the segments 3 and 3' having an axial length which is about the three to fourfold of the axial length of the segments 4 and 4'. The movable electrodes 10 and 10' have an axial length being in excess of the sum of the lengths of the stationary electrodes 3, 4 or 3', 4' so as to overlap the same in direction of the shaft 5. The brushes 12 and 14 are connected to the leading edges of the movable electrodes 10' and 10, respectively, and the brushes 11 and 13 are arranged diametrically opposite to the brushes 12 and 14, respectively.

The operation of this device is as follows:

When the first member or housing 100 is rotated about the shaft 5 by the electric motor (not shown) connected to the plane face 18 of the flanged portion 35, the movable electrodes 10 and 10' carry out rotary movements with respect to the second member 1 kept substantially stationary by the eccentric weight 17 connected thereto. In consequence thereof the movable electrodes 10, 10' rotate about the shaft 5 and change the positions thereof with respect to the stationary electrodes 3, 4, 3', 4' as more clearly shown in Figs. 3–6.

In the position shown in Fig. 3 the brush 14 rigidly and electrically connected with the leading edge of the movable electrode 10 is just in contact with the leading edge of the stationary electrode 3, the brush 13 electrically connected to ground and having a position diametrically opposite to that of the brush 14 and therefore being on the same radius as the leading edge of the movable electrode 10', is in contact with the leading edge of the stationary electrode 3', the brush 12 rigidly and electrically connected to the leading edge of the movable electrode 10' is in contact with the leading edge of the stationary electrode 4', and the brush 11 electrically connected to ground and being arranged on the same radius as the leading edge of the movable electrode 10 is in contact with the leading edge of the stationary electrode 4.

Fig. 4 shows the same parts in the position they have after the movable electrodes 10 and 10' have carried out a rotation through 45° with respect to the position shown in Fig. 3, the brushes 10—14 being in contact, respectively, with the center lines of the stationary electrodes.

Fig. 5 shows the mutual position of the same parts after the movable electrodes 10 and 10' have continued the rotation thereof through another angle of 45°, the movable electrodes 10 and 10' having an angular position exactly coinciding with that of the stationary electrodes 3, 3', 4, 4', respectively.

Fig. 6 shows the mutual position of the same parts after a further rotation of the movable electrodes 10 and 10' through 90° or a total rotation through 180° with respect to the position shown in Fig. 3.

Let $U_{1_0}$ be the residual voltage against ground which the movable electrode 10' has when it is the first time in the relative position shown in Fig. 3. This residual voltage $U_{1_0}$ is indicated in Fig. 3 as a battery shown in dotted lines. In this position the grounded brush 13 comes into contact with the stationary electrode 3' so that the following electric circuit is established: ground, residual voltage $U_{1_0}$, movable electrode 10', capacity C between the movable electrode 10' and the stationary electrode 3', stationary electrode 3', brush 13, ground. In consequence thereof the condenser consisting of the movable electrode 10' and the stationary electrode 3' is charged with a charge Q given by the equation $$Q = CU_{1_0}$$

In the position shown in Fig. 3 the capacity C and therefore the charge Q have their minimal values owing to the mutual position of the movable and stationary electrodes 10', 3'. However, when the rotation is continued in the direction of the arrow the electrodes pass through the position shown in Fig. 4 in which the grounded brush 13 is in contact with the center line of the stationary electrode 3'. As in this position the capacity C between the movable and stationary electrodes 10', 3' has increased to about half its maximum value, the charge Q increases correspondingly. In the position shown in Fig. 5 this capacity reaches its maximum and therefore the charge of the condenser consisting of the movable and stationary electrodes 10' and 3' reaches its maximum value $Q_{max}$. As will be seen from Fig. 5 the brush 13 is at this moment disconnected from the stationary electrode 3'. In consequence thereof the electric circuit described hereinabove is interrupted and the charge $Q_{max}$ remains on the electrodes 10' and 3'. However, the capacity C of the condenser formed by the electrodes 10' and 3' diminishes now continually until it reaches its minimum value $C_{min}$ in the position shown in Fig. 6. In consequence thereof the residual voltage $U_{1_0}$ increases to a value given by the equation $$U_1 = \frac{Q_{max}}{C_{min}}$$

At the moment when the mutual position of the electrodes shown in Fig. 6 is reached the grounded brush 13 is connected to the stationary electrode 3 so that a circuit is established from ground, brush 13, stationary electrode 3, capacity between electrodes 3 and 10', movable electrode 10', voltage $U_1$, to ground. In the further half rotation (not shown by diagrams) a similar cycle is performed between the stationary electrode 3 and the movable electrode 10' so that the charge on the latter is further increased.

As will be seen from Figs. 3–5, the stationary electrode 4' is in contact in these positions with the brush 12 rigidly connected to the movable electrode 10' so that the stationary electrode 4' participates in the potential changes of the movable electrode 10' until the brush 12 slides off the stationary electrode 4' in the position shown in Fig. 5.

Let $U_{2_0}$ be the residual voltage against ground of the movable electrode 10. In the positions shown in Figs. 3–5 the leading edge of the movable electrode 10 is in direct contact through the brush 14 with the stationary electrode 3 so that the electrodes 3 and 10 have the same potential. At the same time an electric circuit is closed as follows (Fig. 3b): ground, brush 11, stationary electrode 4, capacity of the variable condenser consisting of the stationary electrode 4 and the movable electrode 10, movable electrode 10, residual voltage $U_{2_0}$, ground. Therefore analogous conclusions apply to the movable electrode 10 and the stationary electrode 4 as are described hereinabove with respect to the movable electrode 10' and the stationary electrode 3' with one difference: the capacity C of the condenser formed by the electrodes 10' and 3' has a maximal value $C_{max}$ which is much higher than the maximal value of the capacity of the condenser formed by the movable electrode 10 and the stationary electrode 4 because as clearly shown in Fig. 1 the electrode 3 has a much longer extension in the longitudinal direction of the generator than the electrode 4. Therefore the increase in voltage due to the circuit including the electrode 4 is much less than the increase in voltage due to the circuit including the electrode 3'. For these reasons the voltage built up by consecutive rotations of the movable electrodes 10, 10' is mainly due to the interaction of the movable electrode 10' and the stationary electrodes 3 and 3'.

The voltages $U_1$ and $U_2$ cannot increase indefinitely since they are limited by the power of the motor (not shown) driving the generator, and by the conditions of the insulating portions of the generator. Therefore, the final voltage reached by the movable electrodes 10 and 10' with respect to ground has a limited value.

The high potential thus generated in the movable electrode 10 with respect to the grounded housing 100 is transferred by the connections 30' and 30 to the electrode 15 and thus to the brush 16 being in sliding contact therewith. The brush 16 is connected to a consumer (not shown).

It should be noted that the stationary parts of the generator form the inner core thereof, whereas the rotating parts such as the housing 100 and the movable electrodes 10, 10' rigidly connected thereto are arranged so as to be easily accessible from the outside so that they can be readily repaired and/or exchanged in the event of a failure thereof.

Furthermore, the overall volume of the housing 100 is much reduced since the motor (not shown) driving the same does not form a structural element arranged within the housing.

Also the electric motor (not shown) driving the electrostatic generator according to the present invention can be simultaneously used for other purposes as well, for instance for driving parts of a spraying plant including an electrostatic generator according to the present invention as will be better understood from the following description of Fig. 7 showing a second embodiment of the present invention.

Referring now to Fig. 7 of the drawings the first member or housing 200 consists of two electrically insulating parts 42 and 43 cemented together by a suitable cement 44. The insulating part 43 forms at the same time one of the end walls of the housing 200. The housing 200 includes furthermore an inner wall portion 28 formed substantially as a hollow cylinder, an outer wall portion 45 formed as a body of rotation coaxially arranged with the inner wall portion 28, and the other end wall 46 connecting the ends of the inner and outer wall portions 28 and 45 with each other. It will be understood that in this manner a pressure-resistant housing is formed having an annular chamber 48 containing a gaseous dielectric being preferably under pressure and inside which the second member 41 is arranged. The second member 41 is kept stationary by an eccentric weight 47 analogous to the eccentric weight 17 shown in Fig. 1. The second member 41 is provided with supporting members 49, 49' sliding on the inner wall portion 28 of the housing 200 and centering the second member 41 within the annular chamber 48. The outer wall portion 45 is provided with ribs 50 for a purpose more fully to be explained hereinafter.

The movable and stationary electrodes 60 and 61 are arranged oppositely to one another and rigidly connected, respectively, to the outer wall portion 45 of the first member 200 and to the outer face 41a of the second member 41.

Part of the end wall 43 is shaped as a cylinder 19 to the circumference of which a pulley connected with the shaft of an electric motor is connected, for instance by means of an insulating belt.

The opposite end wall 46 is recessed at the outside thereof so as to form a recessed part 22 of spherical or tumbler-like shape which is provided with an electroconductive lining 51 electrically connected by a connection 63 to the moving electrode 60 having a high potential.

Within the inner wall portion 28 formed as a hollow cylinder is arranged a pipe 20 consisting of insulating material and extending over the entire length of the hollow cylinder 28 and projecting into the recessed part 22. The pipe 20 is closed at the end 52 thereof inside the recessed part 22 and communicates through one or more wall openings 23 with the latter. A packing 26 is provided between the pipe 20 and the end wall 46 for a purpose more fully to be explained hereinafter.

The end 53 of the pipe 20 is provided with a screen 24 preferably in form of a spherical calotte the rim 25 of which forms a narrow gap or annular slot 53 with the recessed part 22. The width of the annular slot 53 is adjustable, for instance by means of a ring 27 arranged on the outer wall of the hollow pipe 20 and abutting against the outer face of the end wall 43. It should be understood, however, that in case the motor connected with the motor shaft is directly connected to the cylinder 19 the ring is arranged on the pipe 20 so as to abut against the electroconductive lining 51 of the other end wall 46.

The operation of this device is as follows:

The pipe 20 consisting of insulating material is adjusted by means of the ring 27 so that the annular slot 53 between the recessed part 22 and the spherical screen 24 has a suitable width. Then a spraying material such as a lacquer or a varnish is fed from a container (not shown) through the pipe 20 in the direction of the arrow. Preferably the container (not shown) consists of insulating material or is supported by an insulating support (not shown). Thus it will be understood that the spraying material is not imparted any electrical potential before leaving the pipe 20 through the openings 23.

At the same time the housing 200 is rotated by the shaft of the electric motor driving the cylinder 19 forming part of the end wall 43 of the housing 200. In consequence thereof an electrostatic potential difference is generated between the movable and stationary electrodes 60 and 61 rigidly connected, respectively, with the rotating housing or first member 200 and the stationary second member 41 so that the electroconductive lining 51 is charged to a high potential which is imparted to the spraying material leaving the pipe 20 through the openings 23 and flowing as a thin layer through the annular slot 53 toward the sharp edge 21 of the recessed part 22.

The spraying material is prevented from entering the space between the pipe 20 and the inner wall portion 28 of the housing 200 by the packing 26 which thus prevents a flowing of the spraying material in backward direction outside the pipe 20.

Thus it will be seen that the spraying material is charged electrically by the contact thereof with the electroconductive lining 51 and broken up or sprayed in form of small droplets by the edge 21 of the recessed part 22 which participates in the rotation of the housing 200.

The ribs 50 of the outer wall portion 45 of the insulating housing 200 and the fact that the pipe 20 consists of insulating material prevent the transfer of the high voltage potential from the electroconductive lining 51 to the shaft of the motor driven over the pulley and the belt by the cylinder 19.

In the embodiment shown in Figs. 1 and 2 the outer face 8a of the end wall 8 is provided with insulating ribs in order to increase the electrical distance between the high potential electrode 15 and the conductive wall portion 2.

However, in the embodiment shown in Fig. 7 the outer wall portion 45 consists of insulating material and is provided with ribs 50 for lengthening the electrical distance between the edge 21 and the cylinder 19. The connection to ground which is effected by the conductive wall portion 2 in Fig. 1 is effected in the embodiment shown in Fig. 7 by parts well known per se in the art and thus not shown.

The present invention is by no means limited to the embodiments described hereinabove and it should be understood that other embodiments thereof are to be considered as falling within the scope of the present invention.

What I claim is:

1. An electrostatic high voltage generator, comprising, in combination a first member forming a pressure-resistant hollow housing containing a gaseous dielectric; means for imparting to said housing a rotation about an axis; at least one electrode rigidly connected to said first member to rotate therewith about said axis and being arranged inside said housing in said gaseous dielectric; a second member enclosed in said housing; means journalling said second member in said first member to permit relative rotation of said member about said axis; an electrode fixed to said second member; and means preventing rotation of said second member, thereby causing relative rotation of said members and said electrodes upon rotation of said first member so that an electric potential difference is generated between said electrode fixed to said second member and said electrode rigidly connected to said first member.

2. An electrostatic high voltage generator, comprising, in combination, a first member forming a pressure-resistant hollow housing containing a gaseous dielectric; means for imparting to said housing a rotation about an axis; at least one electrode rigidly connected to said first member to rotate therewith about said axis and being arranged inside said housing in said gaseous dielectric; a second member enclosed in said housing; means journalling said second member in said first member to permit relative rotation of said member about said axis; an electrode fixed to said second member; and means for eccentrically weighing said second member so as to prevent rotation of said second member, thereby causing relative rotation of said members and said electrodes upon rotation of said first member so that an electric potential difference is generated between said electrode fixed to said second member and said electrode rigidly connected to said first member.

3. An electrostatic high voltage generator, comprising, in combination, a first member forming a pressure-resistant hollow housing containing a gaseous dielectric, said housing having two end walls arranged at opposite ends thereof; means for imparting to said housing a rotation about an axis, said imparting means being arranged at one of said two end walls, the other of said two end walls being exposed; at least one electrode rigidly connected to said first member to rotate therewith about said axis and being arranged inside said housing in said gaseous dielectric; a second member enclosed in said housing; means journalling said second member in said first member to permit relative rotation of said member about said axis; an electrode fixed to said second member; and means preventing rotation of said second member, thereby causing relative rotation of said members and said electrodes upon rotation of said first member so that an electric potential difference is generated between said electrode fixed to said second member and said electrode rigidly connected to said first member.

4. An electrostatic high voltage generator, comprising, in combination, a first member forming a pressure-resistant hollow housing containing a gaseous dielectric, said housing having two end walls arranged at opposite ends thereof; means for imparting to said housing a rotation about an axis, said imparting means being arranged at one of said two end walls, the other of said two end walls being exposed; at least one electrode rigidly connected to said first member to rotate therewith about said axis and being arranged inside said housing in said gaseous dielectric; a second member enclosed in said housing; means journalling said second member in said first member to permit relative rotation of said member about said axis; means for eccentrically weighting said second member so as to prevent any appreciable movement thereof in space; an electrode fixed to said second member, said fixed electrode being arranged in said gaseous dielectric; means preventing rotation of said second member, thereby causing relative rotation of said members and said electrodes upon rotation of said first member so that an electric high potential difference is generated between said stationary electrode and said fixed electrode; and means for taking off the high potential from the center of said other one of said two end walls.

5. An electrostatic high voltage generator, comprising, in combination a first member forming a pressure-resistant hollow housing containing a gaseous dielectric, said housing having two end walls arranged at opposite ends thereof; means for imparting to said housing a rotation about an axis, said imparting means being arranged at one of said two end walls, the other of said two end walls being exposed; at least one electrode rigidly connected to said first member to rotate therewith about said axis and being arranged inside said housing in said gaseous dielectric; a second member enclosed in said housing; means journalling said second member in said first member to permit relative rotation of said member about said axis; means for eccentrically weighting said second member to as to prevent any appreciable movement thereof in space; an electrode fixed to said second member, said fixed electrode being arranged in said gaseous dielectric; means preventing rotation of said second member thereby causing relative rotation of said members and said electrodes upon rotation of said first member so that an electric potential difference is generated between said fixed electrode and said electrode rigidly connected to said first member; and a conducting brush being in sliding contact with said other one of said two end walls for taking off the high potential therefrom.

6. An electrostatic corona discharge device, comprising, in combination, a first member forming a pressure-resistant hollow housing containing a gaseous dielectric, said housing having two end walls arranged at opposite ends thereof; means for imparting to said housing a rotation about an axis being substantially perpendicular to said two end walls, said imparting means being arranged at one of said two end walls, the other of said two end walls being substantially spherically recessed at the outside thereof so as to form a spherically recessed part, said recessed part being electroconductive; means connected to said spherically recessed part of said other end wall of said housing for introducing a spraying material into said spherically recessed part; an electrode being electrically connected with said spherically recessed part, said electrode being rigidly connected to said first member to rotate therewith about said axis and being arranged inside said housing in said gaseous dielectric; a second member enclosed in said housing, means journalling said second member in said first member to permit relative rotation of said member about said axis; an electrode fixed to said second member and being arranged in said gaseous dielectric, and means preventing rotation of said second member thereby causing relative rotation of said members and said electrodes upon rotation of said first member so that an electric potential difference is generated between said electrodes, the electric potential of said electrode rigidly connected to said first member being transmitted through said spherically recessed part of said other one of said two end walls to said spraying material introduced thereinto.

7. An electrostatic corona discharge device, comprising, in combination, a first member having an inner wall portion formed substantially as a hollow cylinder; an outer wall portion of said first member, said outer wall portion being formed as a body of rotation coaxially arranged with said inner wall portion; two end walls connecting, respectively, the ends of said inner and outer wall portions with each other, said inner and outer wall portions and said end walls forming a pressure-resistant hollow housing containing a gaseous dielectric; means for imparting to said housing a rotation about an axis being substantially perpendicular to said two end walls, said imparting means being arranged at one of said two end walls, the other of said two end walls being substantially spherically recessed at the outside thereof so as to form a spherically recessed part, said recessed part being electroconductive; a hollow pipe arranged at least partly coaxially with, and inside, said hollow cylinder forming said inner wall portion of said first member so as to terminate inside said spherically recessed part, said hollow pipe being adapted to introduce a spraying material into said spherically recessed part, said spherically recessed part having an outer edge for spraying said spraying material; an electrode being electrically connected with said spherically recessed part, said electrode being rigidly connected to said first member to rotate therewith about said axis and being arranged inside said housing in said gaseous dielectric; a second member enclosed in said housing; means journalling said second member in said first member to permit relative rotation of said member about said axis; an electrode fixed to said second member and being arranged in said gaseous dielectric; and means preventing rotation of said second member thereby causing relative rotation of said members and said electrodes upon rotation of said first member so that an electric potential difference is generated between said electrodes, the electric potential of said electrode rigidly connected to said first member being transmitted through said spherically recessed part of said other one of said two end walls to said spraying material introduced thereinto.

8. An electrostatic corona discharge device, comprising, in combination, a first member having an inner wall portion formed substantially as a hollow cylinder; an outer wall portion of said first member, said outer wall portion being formed as a body of rotation coaxially arranged with said inner wall portion; two end walls connecting, respectively, the ends of said inner and outer wall portions with each other, said inner and outer wall portions and said end walls forming a pressure-resistant hollow housing containing a gaseous dielectric; means for imparting to said housing a rotation about an axis being substantially perpendicular to said two end walls, said imparting means being arranged at one of said two end walls, the other of said two end walls being substantially spherically recessed at the outside thereof so as to form a spherically recessed part, said recessed part being electroconductive; a hollow pipe arranged at least partly coaxially with, and inside, said hollow cylinder forming said inner wall portion of said first member so as to terminate inside said spherically recessed part, said hollow pipe projecting into said spherically recessed part and being provided with at least one opening in said projecting part thereof, said hollow pipe being adapted to introduce a spraying material into said spherically recessed part, said spherically recessed part having an outer edge for spraying said spraying material; an electrode being electrically connected with said spherically recessed part, said electrode being rigidly connected to said first member to rotate therewith about said axis and being arranged inside said housing in said gaseous dielectric; a second member enclosed in said housing; means journalling said second member in said first member to permit relative rotation of said member about said axis; an electrode fixed to said second member and being arranged in said gaseous dielectric; and means preventing rotation of said second member thereby causing relative rotation of said members and said electrodes upon rotation of said first member so that an electric potential difference is generated between said electrodes, the electric potential of said electrode rigidly connected to said first member being transmitted through said spherically recessed part of said other one of said two end walls to said spraying material introduced thereinto.

9. An electrostatic corona discharge device, comprising, in combination, a first member having an inner wall portion formed substantially as a hollow cylinder; an outer wall portion of said first member, said outer wall portion being formed as a body of rotation coaxially arranged with said inner wall portion; two end walls connecting, respectively, the ends of said inner and outer wall portions with each other, said inner and outer wall portions and said end walls forming a pressure-resistant hollow housing containing a gaseous dielectric; means for imparting to said housing a rotation about an axis being substantially perpendicular to said two end walls, said imparting means being arranged at one of said two end walls, the other of said two end walls being substantially spherically recessed at the outside thereof so as to form a spherically recessed part, said recessed part being electroconductive; a hollow pipe arranged at least partly coaxially with, and inside, said hollow cylinder forming said inner wall portion of said first member so as to terminate inside said spherically recessed part, said hollow pipe having a closed end projecting in said spherically recessed part and being provided with at least one opening; a screen arranged at said closed end of said hollow pipe and forming with said spherically recessed part an annular slot, said hollow pipe being adapted to introduce a spraying material through said opening into the space defined by said screen and said spherically recessed part and hence through said annular slot to the outer wall portion of said spherically recessed part, said spherically recessed part having an outer edge for spraying said spraying material; an electrode being electrically connected with said spherically recessed part, said electrode being rigidly connected to said first member to rotate therewith about said axis and being arranged inside said housing in said gaseous dielectric; a second member enclosed in said housing, means journalling said second member in said first member to permit relative rotation of said member about said axis; an electrode fixed to said second member and being arranged in said gaseous dielectric; and means preventing rotation of said second member thereby causing relative rotation of said members and said electrodes upon rotation of said first member so that an electric potential difference is generated between said electrodes, the electric potential of said electrode rigidly connected to said first member being transmitted through said spherically recessed part of said other one of said two end walls to said spraying material introduced thereinto.

10. An electro-static corona discharge device, comprising, in combination, a first member having an inner wall portion formed substantially as a hollow cylinder; an outer wall portion of said first member, said outer wall portion being formed as a body of rotation coaxially arranged with said inner wall portion; two end walls connecting, respectively, the ends of said inner and outer wall portions with each other, said inner and outer wall portions and said end walls forming a pressure-resistant hollow housing containing a gaseous dielectric; means for imparting to said housing a rotation about an axis being substantially perpendicular to said two end walls, said imparting means being arranged at one of said two end walls, the other of said two end walls being substantially spherically recessed at the outside thereof so as to form a spherically recessed part, said recessed part being electroconductive; a hollow pipe arranged at least partly coaxially with, and inside, said hollow cylinder forming said inner wall portion of said first member so as to terminate inside said spherically recessed part, said hollow pipe having a closed end projecting in said spherically recessed part and being provided with at least one opening; a screen arranged at said closed end of said hollow pipe and forming with said spherically recessed part an annular slot; a ring arranged on the outer wall of said hollow pipe and abutting against the outer face of one of said end walls of said first member, said ring being adapted to adjust the width of said annular slot, said hollow pipe being adapted to introduce a spraying material through said opening into the space defined by said screen and said spherically recessed part and hence through said annular slot to the outer wall portion of said spherically recessed part, said spherically recessed part having an outer edge for spraying said spraying material; an electrode being electrically connected with said spherically recessed part, said electrode being rigidly connected to said first member to rotate therewith about said axis and being arranged inside said housing in said gaseous dielectric; a second member enclosed in said housing, means journalling said second member in said first member to permit relative rotation of said member about said axis; an electrode fixed to said second member and being arranged in said gaseous dielectric; and means preventing rotation of said second member thereby causing relative rotation of said members and said electrodes upon rotation of said first member so that an electric potential difference is generated between said electrodes, the electric potential of said electrode rigidly connected to said first member being transmitted through said spherically recessed part of said other one of said two end walls to said spraying material introduced thereinto.

References Cited in the file of this patent

UNITED STATES PATENTS

| | | |
|---|---|---|
| 2,658,472 | Ransburg | Nov. 10, 1953 |

FOREIGN PATENTS

| | | |
|---|---|---|
| 710,852 | Great Britain | June 23, 1954 |